US 11,777,733 B2

(12) United States Patent
Chitalia et al.

(10) Patent No.: US 11,777,733 B2
(45) Date of Patent: Oct. 3, 2023

(54) TOKEN KEYS TO GENERATE CRYPTOGRAMS FOR TOKEN INTERACTIONS (71) Applicant: Visa International Service Association, San Francisco, CA (US)

(72) Inventors: Jalpesh Chitalia, Castro Valley, CA (US); Eduardo Lopez, Menlo Park, CA (US); Christian Flurscheim, Walnut Creek, CA (US); Sayeed Mohammed, Foster City, CA (US); Christian Aabye, Foster City, CA (US); Christoffel Jacobs, Pleasanton, CA (US); Phillip Lavender, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 139 days.

(21) Appl. No.: 17/267,688

(22) PCT Filed: Aug. 13, 2019

(86) PCT No.: PCT/US2019/046307
§ 371 (c)(1),
(2) Date: Feb. 10, 2021

(87) PCT Pub. No.: WO2020/036931
PCT Pub. Date: Feb. 20, 2020

(65) Prior Publication Data
US 2021/0176062 A1 Jun. 10, 2021

Related U.S. Application Data (60) Provisional application No. 62/718,332, filed on Aug. 13, 2018.

(51) Int. Cl.
H04L 9/32 (2006.01)
H04L 9/14 (2006.01)
H04L 9/08 (2006.01)

(52) U.S. Cl.
CPC ............ H04L 9/3213 (2013.01); H04L 9/083 (2013.01); H04L 9/0861 (2013.01); H04L 9/0897 (2013.01); H04L 9/14 (2013.01)

(58) Field of Classification Search
CPC ................. H04L 9/3213; H04L 9/0861; H04L 9/3247; H04L 9/14; H04L 9/0897; H04L 9/0618;
(Continued)

(56) References Cited

U.S. PATENT DOCUMENTS 9,922,322 B2   3/2018 Flurscheim et al.
10,096,027 B2* 10/2018 Hambleton ............ G06Q 40/02
(Continued)

FOREIGN PATENT DOCUMENTS

KR   20160101117 A   8/2016
WO   2015/179637 A1   11/2015

OTHER PUBLICATIONS

International Search Report and Written Opinion for International Appl. No. Application No. PCT/US2019/046307 dated Nov. 29, 2019, 10 pages.
Extended European Search Report for EP Application No. 19849539.2 dated Aug. 13, 2021, 7 pages.
Office Action for Application No. EP19849539.2, dated Jun. 5, 2023, 4 pages.

Primary Examiner — Mohammad A Siddiqi
(74) Attorney, Agent, or Firm — Kilpatrick Townsend & Stockton LLP (57) ABSTRACT Techniques are described for managing master keys for token requestors to use in generating cryptograms such as TAVVs. A processor computer generates a first master key
(Continued)

for a token requestor, the first master key being generated based on (a) a second master key managed by the processor computer and (b) an identifier of the token requestor. The processor computer transmits, to a token requestor computer corresponding to the token requestor, the first master key. The processor computer receives, from the token requestor computer, a request for a token. Responsive to receiving the request for the token, the processor computer transmits the token to the token requestor computer; and receives, from the token requestor computer, an authorization request message comprising the token and a cryptogram generated by the token requestor computer using the first master key and the token.

15 Claims, 6 Drawing Sheets

(58) Field of Classification Search
CPC ..... H04L 9/083; H04L 9/0891; H04L 9/3268; H04L 2209/56
See application file for complete search history.

(56) References Cited

U.S. PATENT DOCUMENTS

| | | | |
|---|---|---|---|
| 2008/0301461 A1* | 12/2008 | Coulier | G06F 21/34 713/184 |
| 2013/0132283 A1* | 5/2013 | Hayhow | G06Q 20/1085 705/67 |
| 2015/0262180 A1* | 9/2015 | Hambleton | G06Q 20/3829 705/44 |
| 2016/0092872 A1 | 3/2016 | Prakash et al. | |
| 2016/0119296 A1 | 4/2016 | Laxminarayanan et al. | |
| 2016/0140545 A1* | 5/2016 | Flurscheim | H04L 63/0838 705/76 |
| 2016/0191236 A1 | 6/2016 | Smirnoff et al. | |
| 2016/0191494 A1* | 6/2016 | Claes | G06F 21/31 713/159 |
| 2017/0255932 A1* | 9/2017 | Aabye | H04L 63/06 |
| 2018/0288031 A1* | 10/2018 | Kumar | H04L 63/0807 |
| 2019/0327085 A1* | 10/2019 | Patel | H04W 12/02 |
| 2021/0058242 A1* | 2/2021 | Donsomsakunkij | H04L 9/0827 |
| 2022/0019995 A1* | 1/2022 | Ngo | G06Q 20/385 |

* cited by examiner

TOKEN KEYS TO GENERATE CRYPTOGRAMS FOR TOKEN INTERACTIONS

CROSS-REFERENCES TO RELATED APPLICATION

This application is a 371 National Phase Application of International Application No. PCT/US2019/046307, filed Aug. 13, 2019, which claims priority to U.S. Provisional Application No. 62/718,332, filed on Aug. 13, 2018, the contents of which are incorporated by reference herein in its their entirety.

BACKGROUND

Cryptograms are used to ensure that digital information originates from a trusted source. For example, cryptograms are used in payment transactions for validation. Card-Not-Present (CNP) transactions may involve the use of a unique payment cryptogram to ensure that an authorization request for a transaction originates from the original token requestor (pre-authenticated entity) and the transaction is unique. One type of payment cryptogram is a token authentication verification value (TAVV).

A transaction cryptogram such as a TAVV is generally generated, for each transaction, on a server device remote from the requesting party. For example, to generate a TAVV, a cryptographic key is required. Keys used to generate TAVVs are derived from issuer master keys only shared by issuers with card production or issuer processing vendors and require protection using highly specialized facilities and equipment. Generating TAVVs outside of a secure execution environment may be difficult. In some cases, a token provider offers a service to token requestors to obtain a TAVV before submitting a token transaction. The token requestor periodically accesses an API to request the payment cryptogram. However, this creates several issues for token requestors.

Requesting a TAVV adds time to the transaction, as the TAVV generally needs to be retrieved from a remote secure server. The token requestors have a need to reduce the latencies associated with fetching the TAVV, while maintaining security.

Embodiments of the invention address these and other problems.

BRIEF SUMMARY

According to some embodiments, a process for token-requestor-based key management may include generating, by a processor computer, a first master key for a token requestor, the first master key being generated based on (a) a second master key managed by the processor computer and (b) an identifier of the token requestor; transmitting, by the processor computer to a token requestor computer corresponding to the token requestor, the first master key; receiving, by the processor computer from the token requestor computer, a request for a token; responsive to receiving the request for the token, transmitting, by the processor computer, the token to the token requestor computer; and receiving, by the processor computer from the token requestor computer, an authorization request message comprising the token and a cryptogram generated by the token requestor computer using the first master key and the token.

According to other embodiments, a processor computer may include a memory; a processor; a non-transitory computer-readable medium comprising instructions, which, when executed by the processor, perform the steps of: generating a first master key for a token requestor, the first master key being generated based on (a) a second master key managed by the processor computer and (b) an identifier of the token requestor; transmitting, to a token requestor computer corresponding to the token requestor, the first master key; receiving, from the token requestor computer, a request for a token; responsive to receiving the request for the token, transmitting the token to the token requestor computer; and receiving, from the token requestor computer, an authorization request message comprising the token and a cryptogram generated by the token requestor computer using the first master key and the token.

According to other embodiments, a method may include receiving, by a token requestor computer from a processor computer in a processing network, a first master key and a token; generating, by the token requestor computer, a cryptogram generation key using the first master key; and generating, by the token requestor computer, a cryptogram using the cryptogram generation key and the token.

According to other embodiments, a token requestor computer may include a memory; a processor; a non-transitory computer-readable medium comprising instructions, which, when executed by the processor, perform the steps of: receiving, from a processor computer, a first master key and a token; generating a cryptogram generation key using the first master key; and generating a cryptogram using the cryptogram generation key and the token.

DETAILED DESCRIPTION

Generally, embodiments provide for techniques for allowing a token requestor to securely generate a cryptogram for a transaction. In some embodiments, a processor computer manages a processor master key (an example of which is a Master Derivation Key (MDK)). The processor master key is used to issue token requestor master keys (an example of which is Token Requestor Master Derivation Keys (TRMDKs)), which enable a token requestor to perform cryptographic operations locally. The token requestor may use a token requestor master key to generate additional keys (e.g., a cryptogram generation key, an example of which is a Unique Derivation Key (UDK)). Alternatively, or additionally, the token requestor may generate a transaction cryptogram. The transaction cryptogram may be generated using the cryptogram generation key and/or token requestor master key.

In some embodiments, the transaction cryptogram is used in conducting a transaction. The token requestor may request a token from the processor computer. The token requestor may generate a cryptogram using the token requestor master key. The token requestor may first use the token requestor master key to generate a cryptogram generation key, then generate the cryptogram using the cryptogram generation key and the token. The token requestor may prepare, and transmit to the processor computer, an authorization request message which includes the cryptogram and the token. The processor computer may then validate the cryptogram to ensure the token originated from the appropriate token requestor.

Prior to discussing the details of some embodiments, description of some terms may be helpful in understanding the various embodiments.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "issuer" may typically refer to a business entity (e.g., a bank) that maintains an account for a user that is associated with a payment card or portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

The term "authentication" and its derivatives may refer to a process by which the credential of an endpoint (including but not limited to applications, people, devices, processes, and systems) can be verified to ensure that the endpoint is who they are declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "token" or "payment token" may include a substitute identifier for some information. For example, a payment token may include an identifier for a payment account that is a substitute for an account identifier, such as a primary account identifier, e.g., a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service" can include a system that that services tokens (e.g., payment tokens). In some embodiments, a token service can facilitate requesting, determining (e.g., generating) and/or issuing tokens, as well as maintaining an established mapping of tokens to token requestor IDs (TRIDs) and/or PANs in a repository (e.g. token vault). In some embodiments, the token service may establish a token assurance level for a given token to indicate the confidence level of the token to TRID binding. The token service may include or be in communication with a token vault where the generated tokens are stored. The token service may support token processing of payment transactions submitted using tokens by de-tokenizing the token to obtain the actual PAN. In some embodiments, a token service may include a token provider computer alone, or in combination with other computers such as a payment processing network computer. Various entities of a tokenization ecosystem may assume the roles of the token provider. For example, payment networks and issuers or their agents may become the token provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "requestor" may be an application, a device, or a system that is configured to perform actions associated with tokens. For example, a requestor can request registration with a network token system, request token generation, token activation, token de-activation, token exchange, other token life-cycle management related processes, and/or any other token related processes. A requestor may interface with a network token system through any suitable communication networks and/or protocols (e.g., using HTTPS, simple object access protocol (SOAP) and/or an extensible markup language (XML) interface). Some non-limiting examples of a requestor may include third party wallet providers, issuers, acquirers, merchants, and/or payment processing networks. A requestor may be a token requestor (TR) when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include Advance Encryption Standard (AES), Data Encryption Standard (DES), Triple Data Encryption Standard/Algorithm (TDES/TDEA), or other suitable algorithms. The key used in the cryptographic algorithm can be of any suitable lengths (e.g., 56-bit, 128-bit, 169-bit, 192-bit, 256-bit, etc.). In some embodiments, a longer key length may provide a more secure encryption that is less susceptible to hacking.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram. A cryptogram may include encrypted characters. Cryptograms can be of any suitable length and may be formed using any suitable data transformation process. Exemplary data transformation processes include encryption, and encryption processes such as DES, triple DES, AES, and ECC may be used. Keys used with such encryption process can be of any appropriate length and may have any suitable characteristics.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "master derivation key" (MDK) can be a key used to generate other keys. An MDK may be managed by an issuer of an account. MDKs may be managed on a per bank identification number (BIN) basis. The MDK may be used for card production, payment processing, etc. In some embodiments, an MDK may be managed by a processor computer that performs token management functions. Such an MDK may be used for token management and validation.

A "cryptogram generation key," (e.g., a unique derivation key (UDK)), can be a key for generating cryptograms. A cryptogram generation key may generated from an MDK, directly or by way of another key. In some embodiments, a cryptogram generation key is a per-card key. The cryptogram generation key may be stored on a chip on a card or a device (e.g. mobile phone).

A "limited-use key" (LUK) can be a key with limited use. A LUK may be token host card emulation (HCE) specific. The LUK may be generated from a cryptogram generation key. The LUK is limited-use in that it may be restricted to a limited time or a limited number of transactions. The LUK may be stored on a device protected by software.

A "payment cryptogram" can be a cryptogram used in a payment process. A payment cryptogram may be generated by a card or device with the UDK/LUK and additional information (e.g., a primary account number, token, and/or information from a chip and point-of-sale (POS)). Different types of payment cryptograms are used in different settings. For a chip card transactions, several payment cryptograms may be used, including cryptogram version number (CVN) 10. For card-not-present (CNP) transactions, a TAVV may be used. For ecommerce, the token may be obtained from a payment processor (e.g., Visa Token Service (VTS)).

The term "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on RSA or elliptic curve cryptography (ECC).

A "digital signature" may refer to the result of applying an algorithm based on a public/private key pair, which allows a signing party to manifest, and/or a verifying party to verify, the authenticity and/or integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party. In some embodiments, the digital signature may be performed in accordance with RSA public key cryptography.

A "certificate" may include an electronic document or data file that uses a digital signature to bind data (e.g., a token) with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of data protected by the certificate including the data fields. The hash may include data contained within the certificate, and/or data that is not contained in the certificate. Hence, a hash can be used to enable the certificate to protect a data set that is larger than the certificate size (e.g., a hash of data fields in the certificate and additional data not contained in the certificate). In some embodiments, each certificate is signed by a certificate authority. In some embodiments, a certificate may be in any suitable format, such as those defined in Europay, MasterCard, and Visa (EMV) standard ISO 9796 and ITU-T standard X.509.

A "certificate authority" (CA) may include one or more server computers operatively coupled to issue certificates to entities. The CA may prove its identity using a CA certificate, which includes the CA's public key. The CA certificate may be signed by another CA's private key, or may be signed by the same CA's private key. The latter is known as a self-signed certificate. The CA also typically maintains a database of all certificates issued by the CA.

Details of some embodiments will now be described.

Figure 1:
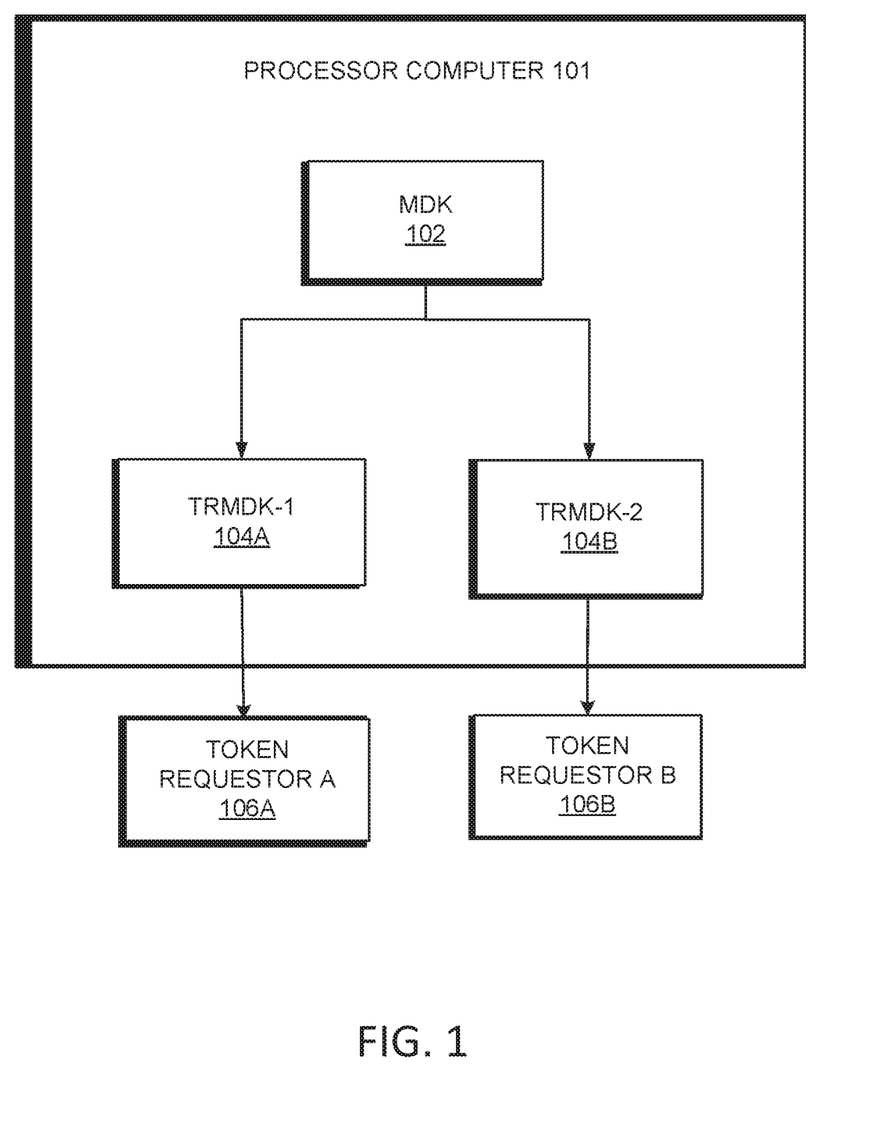
FIG. 1 illustrates techniques for token-requestor-based key management, according to some embodiments.

FIG. 1 illustrates a key scheme for token-requestor-based key management, according to some embodiments. MDK 102 is a key used to generate additional keys. The MDK 102 is assigned to a trusted party (e.g., processor computer 101). In some embodiments, the MDK is stored in a secure element (e.g., a hardware secure module (HSM) on the processor computer 101). The MDK 102 is used to generate token-requestor-specific keys, which are, in turn, used to generate additional keys and/or cryptograms.

In some embodiments, processor computer 101 is a computer for managing tokens and keys. The processor computer 101 may be associated with a payment processor. The processor computer 101 may comprise, or be communicatively coupled to, a HSM for secure management and storage (e.g., of keys). The processor computer 101 may facilitate communication of messages and tracking of information between one or more transport computers (e.g., transport computer 208, shown in FIG. 2) and one or more authorization computers (e.g., the authorization computer 212, shown in FIG. 2). The processor computer 101 may further include functionality to store, generate, and distribute keys. The processor computer 101 may further include functionality to provision, distribute, and validate tokens. Functionality and components of example processor computers are described in further detail below with respect to FIGS. 2 and 3.

In some embodiments, token requestor A 106A and token requestor B 106B are entities that use tokens in a secured manner. A token requestor (e.g., token requestor A 106A and token requestor B 106B) may request payment tokens. In some cases, the token requestor requests the tokens for end-users. Some examples of token requestors include digital wallet providers, payment enablers, merchants and Internet of Things (IoT) manufacturers. Alternatively, or additionally, a token requestor may be consumer that directly requests a token. Token requestors 106A and 106B may be associated with respective token requestor computers. Functionality and components of example token requestor computers are described further below with respect to FIGS. 2 and 4.

A token requestor computer (e.g., a computer associated with token requestor A 106A or token requestor B 106B) may request a token from the processor computer 101. Such a request may include a unique identifier of the token requestor computer ("token requestor identifier"). The token requestor identifier may, for example, be a string of numbers and/or letters which identifies the token requestor.

In some embodiments, the processor computer 101 generates one or more token requestor master derivation keys (TRMDKs) (e.g., TRMDK-1 104A and TRMDK-2 104B, as illustrated in FIG. 1). These TRMDKs may be generated using the processor MDK 102. The TRMDK may further be generated based on information associated with the respective token requestor such as the token requestor identifier. For example, the processor computer 101 may encrypt a token requestor identifier corresponding to Token Requestor A 106A with the processor MDK 102, to generate a unique value, TRMDK-1 104A, for Token Requestor A 112. As another example, the processor computer 101 may generate a TRMDK for a particular payment service provider (e.g., a merchant or an acquirer), based on the MDK along with information characterizing the payment service provider, such as an acquirer ID or merchant ID.

In some embodiments, the processor computer 101 transmits TRMDK-1 104A to the corresponding token requestor, Token Requestor A 106A. The processor computer may distribute the TRMDK securely to Token Requestor A 106A. Similarly, the processor computer 101 may generate and transmit TRMDK-2 104B to token requestor B 106B, based on a token requestor identifier corresponding to token requestor B 106B.

Figure 2:
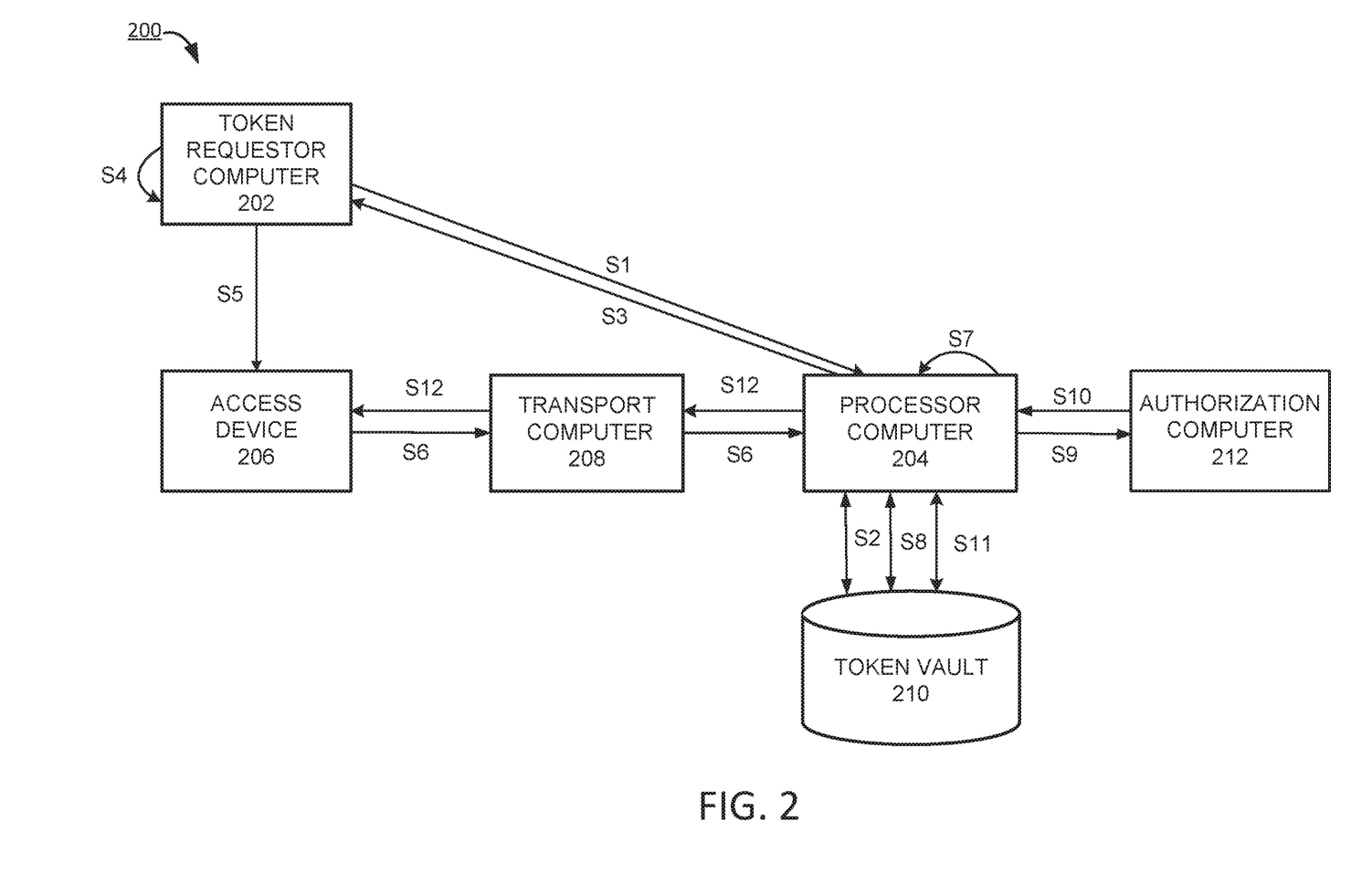
FIG. 2 is a schematic diagram illustrating techniques for token-requestor-based key usage according to some embodiments.

FIG. 2 is a schematic diagram illustrating techniques for token-requestor-based key management according to some embodiments. The system of FIG. 2 includes a token requestor computer 202, an access device 206, a transport computer 208, a processor computer 204, a token vault 210, and an authorization computer 212.

The network computers in FIG. 2 may communicate over a distributed network such as the Internet, or via a series of direct connections, a hybrid of the two, or any other appropriate method of communication between entities. Further, in some embodiments, there may be multiple token requestor computers, access devices, transport computers, processor computers, authorization computers, and/or token vaults.

At step S1, the token requestor computer 202 may request a token from the processor computer 204. Such a request may include a token requestor identifier. The token request may further include a primary account identifier, such as a primary account number (PAN), or other identifier associated with an account or other thing of value.

In some embodiments, the processor computer 204 includes or is communicatively coupled to a token vault 210. Token vault 210 is a secure server where issued tokens and corresponding PANs are stored securely. The token vault may be managed by the processor computer 204 to ensure that tokens are only granted according to token access policies. The token vault 220 may include a token mapping database that maintains established mappings of tokens to real credentials. The token vault may also maintain supplemental data associated with the tokens. Token vaults, due to the sensitive nature of the data mappings that are stored and managed in them, may be protected by strong underlying physical and logical security.

According to various embodiments, the token vault 220 may be part of the processor computer 204. The token vault 220 may be provided by (and/or managed by) a same entity or may be part of a same environment as the processor computer 204. In other embodiments, the token vault 220 may be a storage external to and accessible by the processor computer 204 or individual elements of the processor computer 204 (e.g., the token provisioning module 312, verification module 316, and/or the processing module 318, as described below with respect to FIG. 3).

At step S2, the processor computer 204 retrieves a token from token vault 210, responsive to the received request. The processor computer 204 may, for example, locate the received primary account identifier in the token vault, and identify a token which maps to the primary account identifier. Alternatively, or additionally, the processor computer may provision a new token upon determining that no token corresponding to the primary account number received is available in the token vault.

At step S3, the processor computer 204 transmits the token to the token requestor computer 202. The token requestor computer 202 receives the token from the processor computer 204.

At step S4, the token requestor computer 202 generates a cryptogram. The cryptogram may, for example, be a TAVV. The token requestor computer 202 may generate the TAVV using a TRMDK, which may have been received from processor computer 204 as described above with respect to FIG. 1. Operations for generating a cryptogram by a token requestor are described in further detail below with respect to FIGS. 5 and 6.

At step S5, the token requestor computer 202 may provide the token and the cryptogram to access device 206 for conducting a transaction. The token requestor computer 202 may prepare an authorization request message including the token and the cryptogram. The authorization request message may further be prepared to include transaction-specific information, such as a transaction amount, timestamp, and/or the like. The token requestor computer 202 may transmit the authorization request message to the access device 206.

In some embodiments, the access device 206 is a device such as a POS device, personal computer, or the like. The access device 206 includes functionality for communicating with the token requestor and/or processor computer.

At step S6, the access device 206 transmits the authorization request message to the transport computer 208. The access device 206 may, for example, transmit the authorization request message to the transport computer over a network. Transport computer 208 forwards the authorization request message (comprising the token, TAVV, and other data such as a transaction amount) to the processor computer 204.

In some embodiments, the transport computer 208 may manage one or more accounts. Transport computer 208 may route requests, such as authorization request messages, authorization response messages, settlement requests, or capture requests. As part of settlement, a transport computer may debit or credit an account. Transport computer 208 may correspond to an acquirer and be capable of forwarding messages. Transport computer 208 may also communicate with the processor computer 204. These communications may take place electronically over the Internet or through another suitable network. These communications primarily take the form of authorization requests, authorization responses, settlement requests, or other settlement messages, although they could take other forms depending on the needs of the transport computers or the authorization computer 212. In general, the transport computer 208 can communicate with the processor computer 204 for routing the communications to their intended recipient, e.g., a specific authorization computer 212.

At step S7, the processor computer 204 receives and processes the authorization request message. The authorization request message may comprise the token, cryptogram (e.g., TAVV), and other data such as a transaction amount. The processor computer 204 may verify the cryptogram based on the key(s) used to generate the cryptogram. The processor computer 204 may identify or reproduce a TRMDK associated with the token requestor (e.g., based on a token requestor identifier received in the authorization request message). The processor computer 204 may apply an algorithm to the TRMDK to replicate a cryptogram generation key used to generate the cryptogram. The processor computer 204 and the token requestor computer 202 may coordinate as to what algorithm(s) should be used for cryptographic operations (e.g., TDES, ADS, etc.). The processor computer 204 may generate the cryptogram generation key using information stored by the processor computer and/or received in the authorization request message (e.g., the token requestor identifier).

Upon replicating the cryptogram generation key, the processor computer 204 may use the cryptogram generation key to validate the cryptogram. The processor computer may 204 validate the cryptogram by decrypting the cryptogram using the cryptogram generation key and verifying the contents of the decrypted cryptogram (e.g., if the cryptogram was generated based on a token and a timestamp, the processor computer 204 may ensure that the token and the timestamp in the cryptogram matches a token and timestamp received in the authorization request message). Alternatively, or additionally, the processor computer 204 may validate the cryptogram by generating a cryptogram using the cryptogram generation key (e.g., by applying a predetermined algorithm to a predetermined dataset such as the token and timestamp). If the generated cryptogram matches the received cryptogram, then the processor computer 204 may validate the received cryptogram. If the generated cryptogram does not match the received cryptogram, then the processor computer 204 may refrain from validating the cryptogram. The processor computer 204 may validate the cryptogram for the issuer of the account corresponding to the token (e.g., an entity associated with authorization computer 212).

The processor computer 204 may generate a cryptogram validation result (e.g., a code, understandable by the authorization computer 212, indicating whether the cryptogram is valid). Based on the token, the processor computer 204 identifies the corresponding primary account identifier. The processor computer 204 modifies the authorization request message to include the primary account identifier. The processor computer 204 may generate a modified authorization request message that includes the primary account identifier, cryptogram validation results, and/or cryptogram.

The processor computer 204 may analyze the authorization request message to determine that the authorization computer 212 is associated with the authorization request message. Such identification of the corresponding authorizing computer may be performed by analyzing a portion of the account number that corresponds to a bank identification number (BIN), which can be used to access a database that has the corresponding authorizing computer stored in association with the BIN.

At step S9, the processor computer 204 transmits the modified authorization request message, with the primary account identifier and cryptogram validation results, to authorization computer 212.

In some embodiments, the authorization computer 212 may to approve or decline the authorization request, based on the information comprised in the received modified authorization request message.

In some embodiments, the authorization computer 212 includes functionality to receive and analyze authorization request messages, e.g., to identify a stored record that corresponds to the account information provided in the request. Authorization response messages can then be created. Such authorization response messages may contain an indication of whether or not the authorization request message is authorized, as well as information regarding the authorization status of the request or other information.

In some embodiments, the authorization computer/issuer need not validate the cryptogram (e.g., TAVV), as the processor has validated the cryptogram and included validation information in the authorization request message.

Based on the validation information and other information, the authorization computer makes the decision to approve or decline the transaction.

In some embodiments, based on the decision to approve or decline the authorization request, the authorization computer 212 may prepare an authorization response message indicating whether the transaction should be approved or declined. The authorization computer 212 may include, in the authorization response message, an authorization result (e.g., an indicator of whether the authorization request is approved or declined. At step S10, the authorization computer 212 transmits the authorization response message to the processor computer 204. The processor computer 204 receives the authorization response message.

At step S11, the processor computer 204 may retrieve the token from token vault 210, based on the primary account identifier received in the authorization response message. The processor computer 204 modifies the authorization response message to include the token in lieu of the primary account identifier.

At step S12, the processor computer transmits the authorization response message to the access device, which may be via the transport computer. The transport computer 208 may forward the authorization response message to the access device 206.

Subsequently, the access device may receive the authorization response message, and the transaction may proceed or terminate based on the results therein. At the end of the day or at any other suitable time period, a clearing and settlement process, as is known in the art, may be performed between the transport computer 208, the processor computer 204, and the authorization computer 212.

Figure 3:
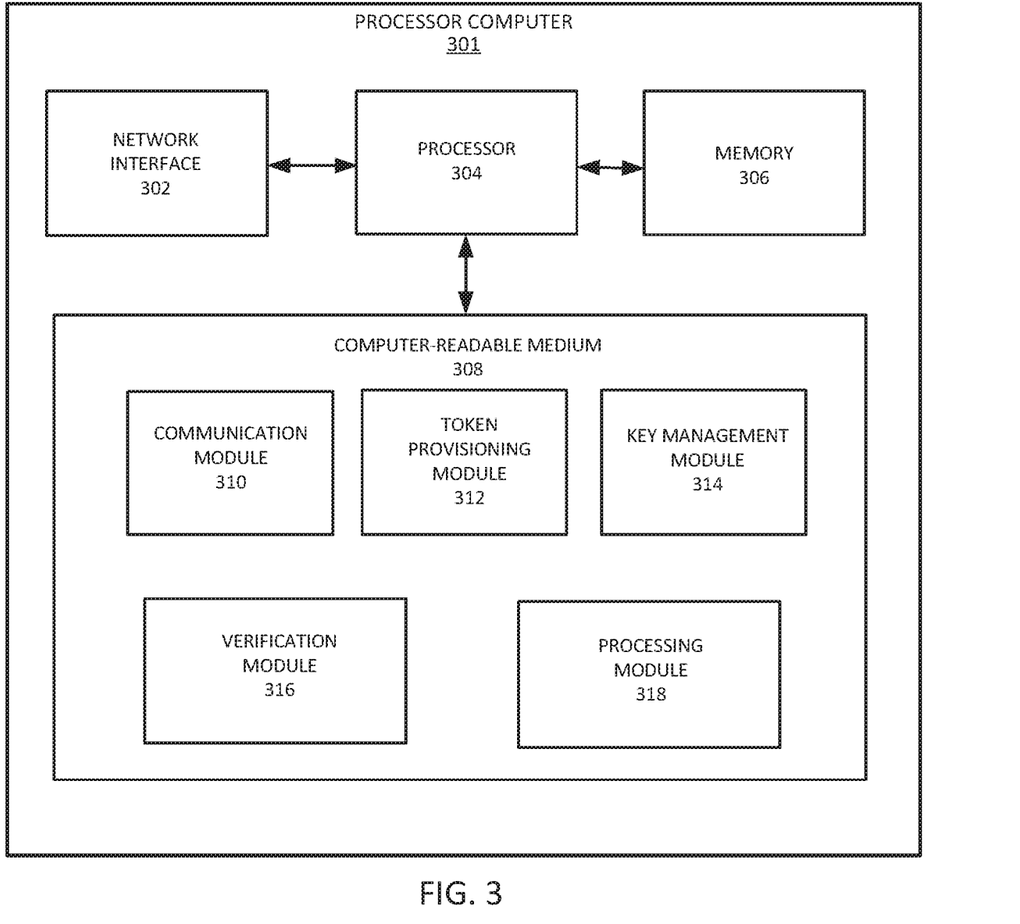
FIG. 3 illustrates a block diagram of a processor computer, according to some embodiments.

FIG. 3 shows a block diagram of a processor computer 301, according to some embodiments. Processor computer 301 may include a network interface 302, processor 304, memory 306, and computer-readable medium 308.

The processor 304 may be implemented as one or more integrated circuits (e.g., one or more single core or multicore microprocessors and/or microcontrollers). The processor 304 may be used to control the operation of the processor computer 301. The processor 304 can execute a variety of programs in response to program code or computer-readable code stored in memory 306. The processor 304 may include functionality to maintain multiple concurrently executing programs or processes.

The network interface 302 may be configured to connect to one or more communication networks to allow the processor computer 301 to communicate with other entities such as a resource provider computer, transport computers, routing administration interface, etc. For example, communication with the transport computers can be direct, indirect, and/or via an application programming interface (API).

The memory 306 may be implemented using any combination of any number of non-volatile memories (e.g., flash memory) and volatile memories (e.g., DRAM, SRAM), or any other non-transitory storage medium, or a combination of media. In some embodiments, the memory 306 may also comprise a secure element (e.g., a HSM), which may store encryption keys, account identifiers, and/or tokens and cryptograms.

The computer-readable medium 308 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 308 may be any combination of such storage or transmission devices.

The computer-readable medium 308 may comprise software code stored as a series of instructions or commands. The computer-readable medium 308 comprises code, executable by the processor 304, to implement methods as described herein. The computer-readable medium 308 may comprise a communication module 310, a token provisioning module 312, a key management module 314, a verification module 316, and a processing module 318. Each of these modules may include code configured to perform the functions described below in conjunction with the processor 304.

The communication module 310 may comprise code that causes the processor 304 to generate messages, forward messages, reformat messages, and/or otherwise communicate with other entities.

The token provisioning module 312 may comprise code that causes the processor 304 to generate and/or provide a token. The token provisioning module 312 may be configured to generate a token in response to a request for a token from a token requestor. In one embodiment, the token provisioning module 312 may receive a token request including a token requestor identifier, a primary account identifier, an expiration date, a verification value (e.g., a Card Verification Value 2 (CVV2)), and/or the like. Additional information included in the token request may include, for example, a consumer name, a consumer address and zip code, a requested token type (e.g., payment static, payment dynamic, non-payment, etc.), a card verification status (e.g., Address Verification Service (AVS)/Card Verification Value (CVV) check status), a Mobile Station International Subscriber Directory Number (MSISDN), a Universally Unique Identifier (UUID), an International Mobile Equipment Identity (IMEI), an Operating System (OS) type/version and any other suitable information.

In some embodiments, the token provisioning module 312 may generate a token response with a token number and other information such as a token expiration date. In one embodiment, the token provisioning module 312 may validate the token requestor identifier, determine the PAN type and generate a token from the respective token BIN ranges. The token vault associated with processor computer 301 may maintain the correlation between the PAN, token requestor, and/or the token. In one embodiment, the token provisioning module 312 may determine if a token already exists in the token vault corresponding to the PAN before generating a new token. In some embodiments, if a token cannot be provided, the token response may include a corresponding reason code. The token provisioning module 312 may also provide an interface to the token requestors to submit a bulk token request file (e.g., so that multiple primary account identifiers may be tokenized simultaneously).

In one embodiment, the tokens may be generated on-the-fly via API calls. For example, when a request is received to tokenize a primary account identifier, the token provisioning module 312 may determine a token range to assign the token. For example, the token range may be assigned based on whether the issuer is provisioning the token (e.g., issuer assigned token range) or the processor computer 301 is provisioning the token on-behalf-of the issuer (e.g., a processor computer assigned token range). As an example, if the processor computer 301 assigned token range includes "442400000-442400250," then "4424000000005382" may be assigned as a token value. The token vault may store the relationship of the token range to the primary account identifier and a token add record may be logged. In some embodiments, the token provisioning module 312 may consider the token range list associated with the primary account identifier range before assigning a token.

In one embodiment, the token provisioning module 312 may access a token range table that represents available token ranges and token ranges have not been associated with primary account identifier ranges. The token provisioning module 312 may access another table that includes minimum and maximum account ranges for the primary account identifier and the associated token ranges. The token ranges may include the token ranges provisioned.

In some embodiments, the tokens may be algorithmically derived. For example, in some embodiments, an encryption process using encryption algorithms such as DES, triple DES, and AES may be used to encrypt a real primary account identifier to create a token. In other embodiments, the tokens may not be algorithmically derivable. For instance, a token may be generated using a pseudo-random algorithm so that the token is independent of the real primary account identifier and the association of the token to the primary account identifier may be provided solely through the use of a lookup table.

The key management module 314 may comprise code that causes the processor 304 to generate and distribute keys to token requestors. The key management module 314 may include logic for generating a token requestor key based on a processor MDK and/or an identifier of a corresponding token requestor. The key management module 314 may include logic for securely storing one or more processor MDKs. The key management module 314 may manage distribution of TRMDKs to the appropriate respective token requestors. The key management module 314 may further comprise code that causes the processor 304 to execute key exchange and rotation processes.

The verification module 316 may comprise code that causes the processor 304 to validate a cryptogram or token. Validating a cryptogram or token may include one or more of—verifying stored records, verifying a digital signature, and or processing received verification data.

In some embodiments, verification module 316 may include logic that causes the processor 304 to confirm that an authorization request message is authentic by decrypting a cryptogram included in the message. The verification module 316 may replicate a cryptogram generation key using a TRMDK and other data, and use the cryptogram generation key to decrypt the cryptogram. Upon performing verification based on the decrypted cryptogram (e.g. by comparing the contents of the decrypted cryptogram to information received in association with the cryptogram), the verification module 316 may re-encrypt the cryptogram. Alternatively, or additionally, the verification module 316 may use the cryptogram generation key to generate a new cryptogram (e.g., based on data used to generate the original cryptogram), and compare the two to verify a match. The verification module 316 may include encryption models for performing encryption and/or decryption, such an issuer-specific key or merchant-acquirer encryption models. The verification module may include keys and algorithms (e.g., DES, TDES, AES) that can be used with the processor 304 to generate transaction specific cryptograms and decrypt such cryptograms. The verification module may compare information obtained by decrypting the cryptogram with the token and/or other data received in the authorization request message.

The verification module 316 may be configured to execute a consumer verification and authentication process and validate a token based on the outcome of the verification and authentication process. For example, the verification module 316 may perform consumer authentication and verification through a configured authentication scheme. In one embodiment, the authentication scheme may include verification of the payment account number, cryptogram, and the expiration date based on the customer information stored in a database associated with the payment processing network. In one embodiment, the authentication scheme may include direct verification of the consumer by an authorization computer (e.g., authorization computer 212 of FIG. 2) with consumer credentials for their online banking system.

The processing module 318 may comprise code that causes the processor 304 to process authorization requests and responses. Processing authorization requests and responses may include identifying an appropriate authorizing computer or transport computer to which to forward such a message. The processing module 318 may further detokenize or retokenize such messages. For example, processing module 318 may identify a primary account number which maps to a token stored in the token vault.

The processing module 318 may comprise code, executable by the processor 304, to process an authorization request message comprising a token. In some embodiments, the processing module 318 may approve or decline the transaction using various data associated with the transaction such as a cryptogram associated with a token, token domain, token number, token timestamp, token expiration date, token assurance level, a determination that the account used to conduct the transaction is lost, stolen, or compromised, or any other suitable data. The aforementioned data may be determined from the contents of the authorization request message for a transaction, a token registry database, or any other suitable source.

In one embodiment, the processing module 318, working in conjunction with the processor 304, may provide support for token exchange. For example, the processing module 318 may modify the authorization request message to replace the token with a primary account identifier and send the modified authorization request message to the authorization computer 212. The processing module 318 may also restore the token in the authorization response message received from the authorization computer 212 before forwarding it to the transport computer 208. In some embodiments, records of the authorization may be contained in an authorization log database that can be transmitted to the participating acquirers. The data contained in the authorization log database can be in a plurality of file formats.

In some embodiments, the processing module 318 may further comprise code for authentication operations. The processing module 318 may comprise code that can be executed to the processor 304 to apply one or more authentication methods to authenticate token transactions. In one embodiment, the processing module 318 may comprise code for authenticating the QR™ code token transactions using existing authentication schemes (e.g., entering personal information into a keypad).

Figure 4:
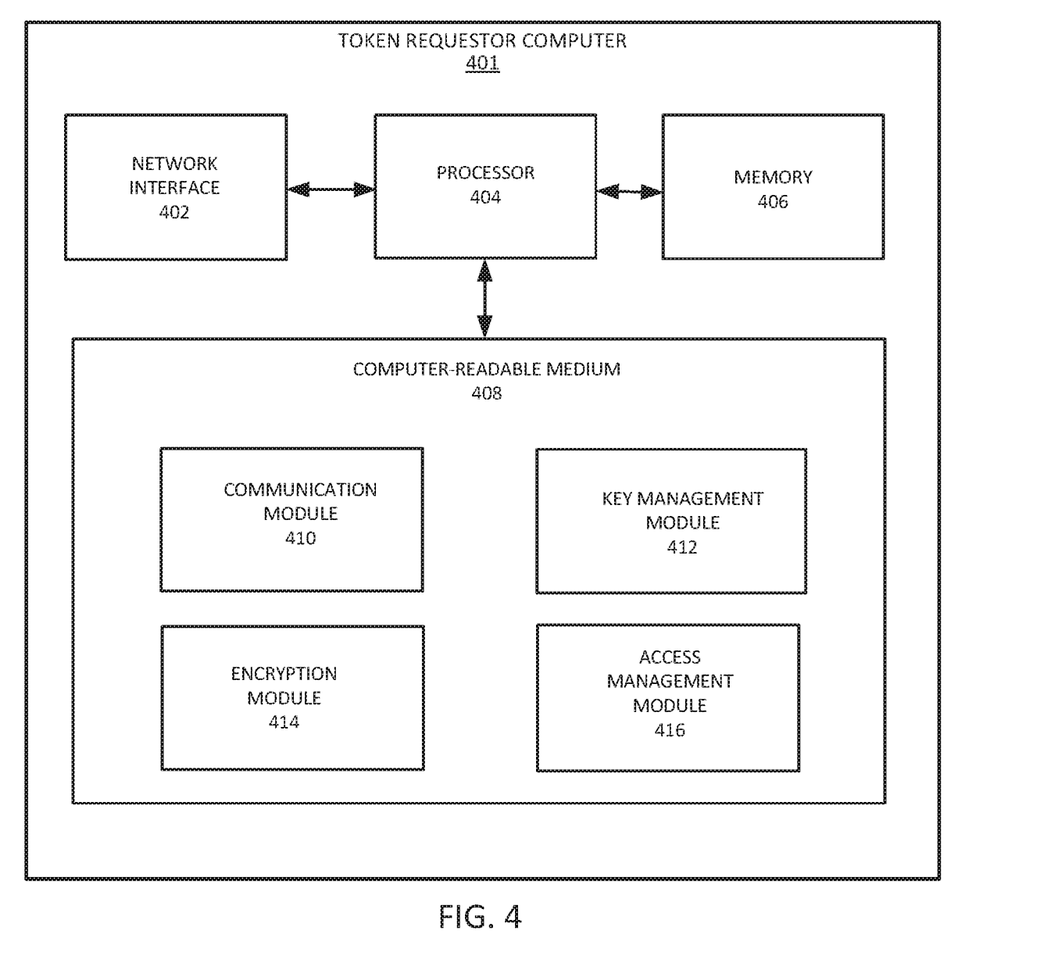
FIG. 4 illustrates a block diagram of a token requestor computer, according to some embodiments.

FIG. 4 shows a block diagram of a token requestor computer 401, according to some embodiments. Token requestor computer 401 may include a network interface 402, processor 404, memory 406, and computer-readable medium 408.

The processor 404, network interface 402, and memory 406 may be substantially similar to the processor 304, network interface 302, and memory 306, respectively, as described above with respect to FIG. 3.

The computer-readable medium 408 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 408 may be any combination of such storage or transmission devices.

The computer-readable medium 408 may comprise software code stored as a series of instructions or commands. The computer-readable medium 408 comprises code, executable by the processor 404, to implement methods as described herein. The computer-readable medium 408 may comprise a communication module 410, a key management module 412, an encryption module 414, and an access management module 416. Each of these modules may include code configured to perform the functions described below in conjunction with the processor 404.

The communication module 410 may comprise code that causes the processor 404 to generate messages, forward messages, reformat messages, and/or otherwise communicate with other entities.

The key management module 412 may manage the storage and generation of keys. The key management module 412 may store encryption keys that can be used with encryption algorithms. The other keys of any corresponding key pairs may be stored by the key management module 314 in the processor computer 301. In some embodiments, the token requestor computer 401 and the processor computer 301 may store respective cryptographic keys of a cryptographic key pair. The key management module 412 may comprise code that causes the processor 304 to generate and distribute keys to token requestors. The key management module 412 may include logic for generating a cryptogram generation key based on a token requestor master key.

The encryption module 414 may include any suitable encryption algorithms to encrypt data in embodiments of the invention. Suitable data encryption algorithms may include DES, TDES, AES, etc. The encryption module 414 may utilize symmetric or asymmetric encryption techniques to encrypt and/or verify data. The encryption module 414 may utilize the encryption keys managed by the key management module 412 for encrypting data. The encryption module 414 may generate cryptograms (e.g., a transaction cryptogram or TAVV).

The access management module 416 may comprise code that causes the processor 404 to manage access to a resource. The access module may, for example, include code for generating authorization request messages including tokens, cryptograms, transaction details, and/or the like. Alternatively, or additionally, the access management module 416 may include code for receiving an authorization request message (e.g., from a user device operated by a consumer), and identify an appropriate access device (e.g., 206) to which to transmit the authorization request message. The access management module 416 may further include code for analyzing a received authorization response message.

Figure 5:
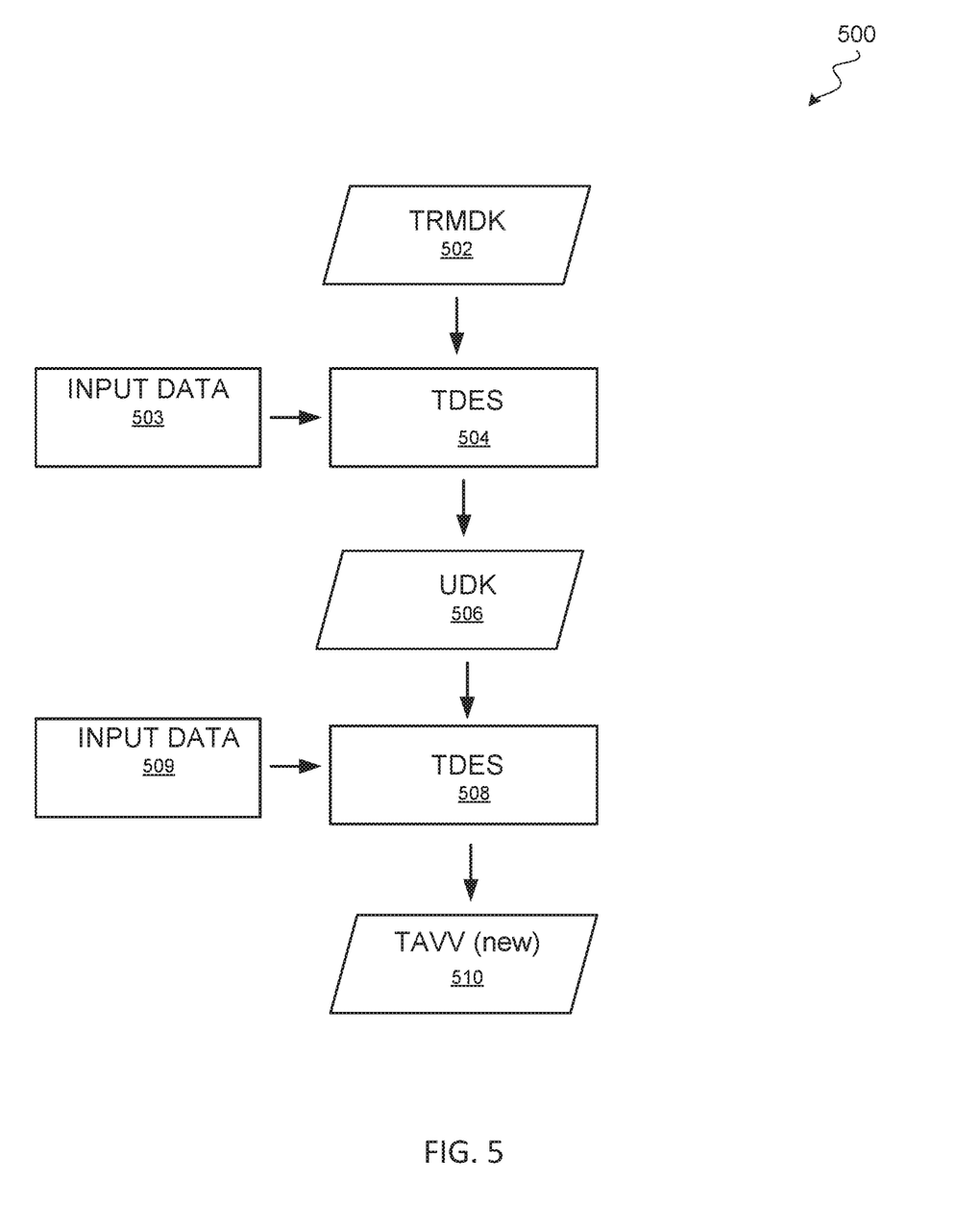
FIG. 5 shows example operations for generating a TAVV using a TRMDK according to embodiments of the present invention.

FIG. 5 shows an overview of example operations 500 for generating a cryptogram (e.g., TAVV) by a token requestor, using a unique token requestor master key (TRMDK). The TRMDK is unique to the token requestor.

At 502, a token requestor computer may receive a TRMDK from a processor computer. The processor computer may transmit the TRMDK to the token requestor computer using a pre-established key management process. The token requestor computer may store the TRMDK.

At 504, the token requestor computer may apply an algorithm (e.g., TDES 504) to the TRMDK and input data 503. The input data 503 may include data such as a token requestor identifier, token, timestamp, and/or the like. The output may be a cryptogram generation key (e.g., a unique derivation key or UDK 506). The token requestor may generate the UDK using TDES encryption. Alternatively, the token requestor may generate the UDK with another cryptographic algorithm, such as AES or DES.

At 508, the token requestor computer may apply an algorithm (e.g., TDES 508) to the cryptogram generation key (e.g., UDK 506) and input data 509. The input data 509 may include data such as a token requestor identifier, token, primary account number, expiration date, location, timestamp, and/or the like. The output may be a cryptogram (e.g., TAVV 510). The token requestor computer may generate the TAVV using TDES. Alternatively, the token requestor may generate the TAVV with another cryptographic algorithm, such as ADS or DES.

Figure 6:
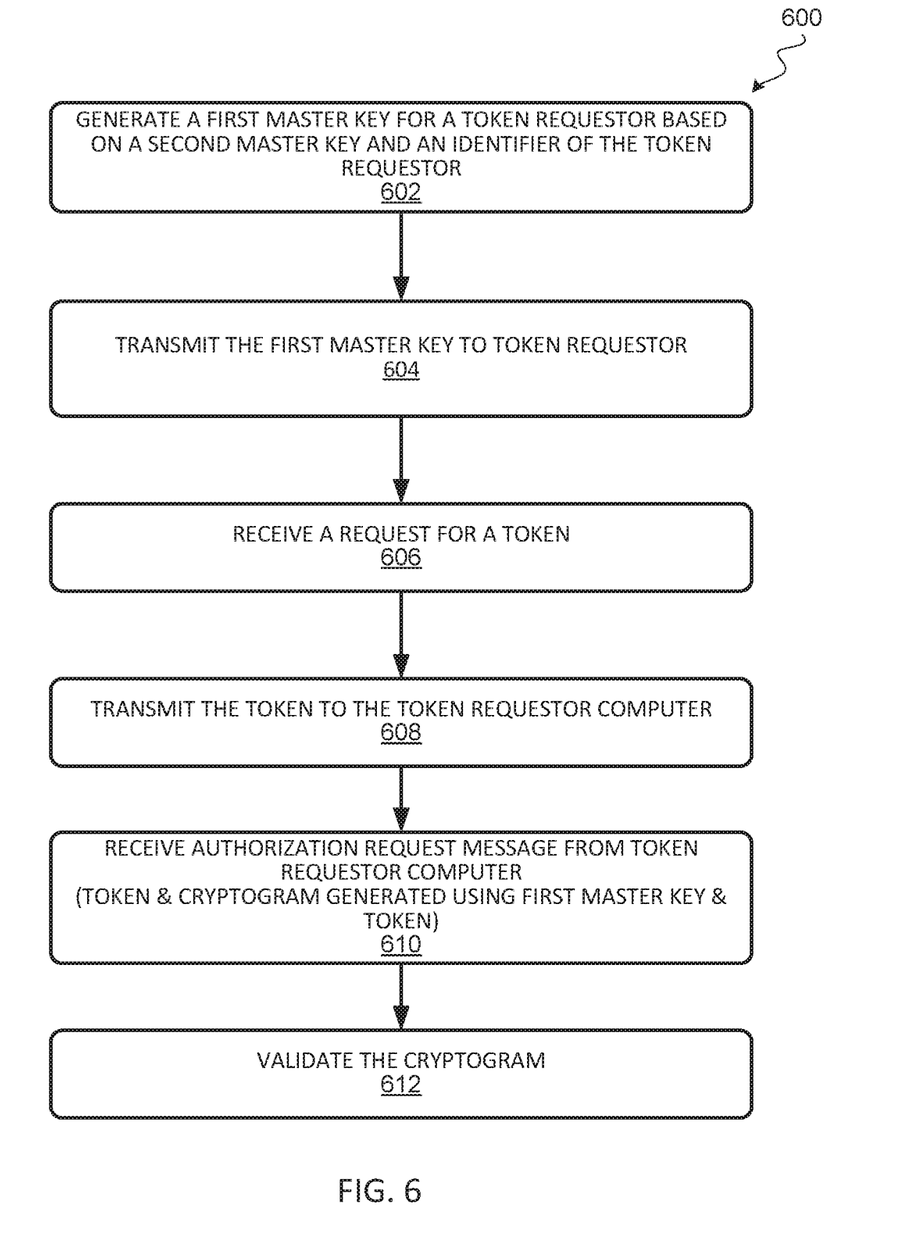
FIG. 6 is a flow chart illustrating a method according to some embodiments.

FIG. 6 is a flowchart illustrating a method 600 according to some embodiments. The method 600 may be performed by the processor computer as shown in FIGS. 2 and 3.

At 602, the processor computer generates a first master key (e.g., a TRMDK) for a token requestor. The processor computer generates the first master key based on a second master key and an identifier of the token requestor. The second master key may be a processor MDK securely managed by the processor computer.

The processor computer may use a derivation function to generate the first master key. The processor computer may encrypt a value, such as the identifier of the token requestor, with the second master key (e.g., the processor MDK), to generate a unique master key for the token requestor.

At 604, the processor computer transmits the first master key to the token requestor. The processor computer may transmit the first master key to the token requestor over a network. The processor computer may take measures to ensure that the first master key is transmitted securely.

At 606, the processor computer receives a request for a token. The token request may be received in a message from the token requestor computer. The token request may include information such as a primary account identifier, a token requestor identifier, a timestamp, and/or the like.

The processor computer may retrieve or generate a token based on the received information. For example, the processor computer may generate a token based on the primary account identifier and the token requestor identifier. Alternatively, or additionally, the processor computer may retrieve the token from the token vault.

At 608, the processor computer transmits the token to the token requestor computer. The processor computer may transmit the token to the token requestor computer securely over a network.

Subsequently, the token requestor computer receives the token. The token requestor computer generates a cryptogram using the first master key and the token. In some embodiments, the token requestor computer generates a cryptogram generation key (UDK) prior to generating the cryptogram. The token requestor computer may use the first master key to encrypt some value using a predetermined algorithm. For example, the token requestor computer may use TDES to encrypt the token requestor identifier using the first master key. Alternatively, or additionally, algorithms such as AES and DES may be used.

In some embodiments, the token requestor computer uses the UDK to generate a cryptogram. The token requestor computer may use the cryptogram generation key to encrypt some value using a predetermined algorithm. For example, the token requestor computer may use TDES to encrypt the token using the cryptogram generation key. Alternatively, or additionally, algorithms such as AES, and DES may be used. The cryptogram may further be generated based on information unique to the token requestor such as a timestamp, a shared secret, location data, and/or the like.

In some embodiments, the token requestor computer prepares an authorization request message. The authorization request message may include the token and the cryptogram. The authorization request message may further include transaction information such as a transaction amount, merchant identifier, and/or the like.

At 610, the processor computer receives the authorization request message from the token requestor computer. The authorization request message includes the token and the cryptogram.

At 612, the processor computer validates the cryptogram. The processor computer may decrypt the cryptogram. The processor computer may identify information in the cryptogram (e.g., token requestor identifier, transaction data, etc.) and compare the information to corresponding expected values. For example, the processor computer may determine whether a transaction amount in the authorization request matches a transaction amount in the cryptogram. The processor computer may further compare the token to other information in the authorization request message (e.g., a domain or presentment mode in which the token is being used) to enforce domain restrictions.

In some embodiments, if the cryptogram and/or token are validated, the processor computer detokenizes the authorization request message and proceeds with the transaction, as described above with respect to FIG. 1. If the cryptogram and/or token are not validated, then the processor computer may terminate the transaction. Alternatively, the processor computer may proceed sending a modified authorization request message to the authorization computer, indicating that the token is not validated.

Various methods may be used to generate a cryptogram such as a TAVV with reduced latency. Several options are possible, including not sharing keys, sharing TRMDKs as described above, sharing limited use keys, sharing asymmetric keys, and perfect forward secrecy.

As a first example, keys are not shared with the token requestor. Latency may be reduced by pre-fetching tokens, post-fetching tokens, and/or use of multi-threaded processing. This can reduce TAVV latency from about 700 milliseconds (ms) to about 150 ms.

Alternatively, or additionally, latency may be reduced by reducing the physical distance between the token requestor and the server generating the keys. The processor computer may execute cryptogram generation in an HSM server located in the token requestor's data center. The processor may manage the HSM server, but locate the HSM server in the token requestor's data center to mitigate latencies.

As another option, the processor computer may share a new TRMDK on a per-token-requestor basis (e.g., as described above with respect to FIGS. 5 and 6). The TRMDKs may be generated from a single MDK. The token requestor can derive a per token-UDK from the TRMDK and generate a per-transaction TAVV from the TRMDK. The processor computer may then validate the TAVV and pass the results to the issuer.

As a variation on the TRMDK technique, the processor computer may further generate and manage separate MDKs on a per token-requestor basis. For example, the processor computer stores multiple MDKs including a primary MDK, a MDK for Retailer 1 (generated via the primary MDK) and an MDK for Retailer 2 (generated via the primary MDK). The processor computer generates a Retailer 1 TRMDK using the MDK for Retailer 1. The processor computer sends the Retailer 1 TRMDK to Retailer 1. The processor computer generates a Retailer 2 TRMDK using the MDK for Retailer 2. The processor computer sends the Retailer 2 TRMDK to Retailer 1.

As another variation on the TRMDK technique, the TRMDK may be of limited use, and referred to as a token requestor limited-use key (TRLUK). The TRLUK may be generated from a single MDK. The processor computer may generate the TRLUKs on a per-token-requestor basis and distribute the TRLUKs to respective token requestors. A TRLUK is a limited-use key and will become obsolete after a period of time or a particular number of transactions. Hence, the token requestor would need to periodically request a new TRLUK.

As another example, the system may use asymmetric keys to generate the TAVV. Each token requestor may be assigned a respective private/public key pair, and keep the private key secret. A new cryptographic architecture may be defined and developed based on asymmetric private/public key pairs. The TAVV may be generated using a private key stored at the token requestor. The processor computer may validate the TAVV, while this method also allows for the possibility of issuer validation. The processor computer may validate the TAVV/cryptogram using the corresponding public key. Alternatively, or additionally, the processor computer may configure a certificate authority to certify the various public keys distributed to different partners. The token requestor may be given a certificate. In either case, the token requestor is able to generate the TAVV using the private key without the need to access an Application Programming Interface (API).

Using asymmetric keys leads to a TAVV much larger (e.g., in bytes) than a standard TAVV. Thus, a different data field may be used to transmit the TAVV generated using asymmetric keys, as compared to the data field traditionally used to transmit a TAVV generated using symmetric keys. For example, the TAVV could be transmitted in Field 34 for Visa® authorization messages.

As yet another example, the system uses perfect forward secrecy. Perfect forward secrecy is a method for protecting data using public/private keys that only the intended recipient can read. A key derivation function is used to generate an ephemeral key. Data is encrypted with the key. The key is then encrypted with a known public key of the recipient. The encrypted data and the random encryption key may be shared, wrapped by the public key. Only the recipient can retrieve the encryption key, using their private key and then decrypt the data with the random key.

Embodiments may provide a number of advantages. For example, latency associated with obtaining a TAVV can be reduced from about 700 ms to about 100 ms. In some prior systems, a token requestor must send multiple request messages back and forth to an issuer or token service provider in order to obtain a TAVV and move forward with authorizing a transaction using a token. With the techniques described herein, the token requestor can generate a TAVV for a transaction without the significant latency associated with requesting the TAW from another entity. This reduces the amount of processing and network transmissions required in the overall system, as the techniques described herein obviate the need for the token requestor to obtain TAVVs from a remote server.

Embodiments may provide a number of additional advantages. The processor computer maintains control over the MDK in a secure element, protecting the sensitive MDK. The processor computer further maintains control over the allocation of TRMDKs to the appropriate entities. Thus, security is preserved, preventing fraudulent use of the keys. Further, by managing the keys and validating the cryptograms on behalf of the issuer, the processor computer reduces the amount of processing and messaging required by the issuer.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   generating, by a processor computer, a first master key for a token requestor, the first master key being generated as an output of a cryptographic function that processes (a) a second master key managed by the processor computer and (b) an identifier of the token requestor;
   transmitting, by the processor computer to a token requestor computer corresponding to the token requestor, the first master key;
   receiving, by the processor computer from the token requestor computer, a request for a token;
   responsive to receiving the request for the token, transmitting, by the processor computer, the token to the token requestor computer;
   receiving, by the processor computer from the token requestor computer, an authorization request message comprising the token and a cryptogram generated by the token requestor computer using the first master key and the token;
   validating, by the processor computer, the cryptogram;
   identifying, by the processor computer, a primary account identifier corresponding to the token;
   generating, by the processor computer, a modified authorization request message comprising an indication of the validation of the cryptogram and the primary account identifier; and
   transmitting, by the processor computer to an authorization computer, the modified authorization request message.

2. The method of claim 1, wherein the token requestor computer generates a cryptogram generation key using the first master key, and the cryptogram is generated using the cryptogram generation key and the token.

3. The method of claim 1, further comprising receiving, by the processor computer, an authorization response message from the authorization computer, the authorization response message comprising an authorization result generated by the authorization computer based on the modified authorization request message.

4. The method of claim 1, wherein the token is domain restricted.

5. The method of claim 1, wherein the second master key is stored in a hardware secure module (HSM) in the processor computer.

6. The method of claim 1, wherein the first master key has a limited use.

7. A processor computer comprising:
   a memory;
   a processor;
   a non-transitory computer-readable medium comprising instructions, which, when executed by the processor, perform the steps of:
   generating a first master key for a token requestor, the first master key being generated as an output of a cryptographic function that processes (a) a second master key managed by the processor computer and (b) an identifier of the token requestor;
   transmitting, to a token requestor computer corresponding to the token requestor, the first master key;
   receiving, from the token requestor computer, a request for a token;
   responsive to receiving the request for the token, transmitting the token to the token requestor computer;
   receiving, from the token requestor computer, an authorization request message comprising the token and a cryptogram generated by the token requestor computer using the first master key and the token;
   validating, by the processor computer, the cryptogram;
   identifying, by the processor computer, a primary account identifier corresponding to the token;
   generating, by the processor computer, a modified authorization request message comprising an indication of the validation of the cryptogram and the primary account identifier; and
   transmitting, by the processor computer to an authorization computer, the modified authorization request message.

8. The processor computer of claim 7, wherein generating the cryptogram by the token requestor comprises generating a cryptogram generation key using the first master key, and the cryptogram is generated using the cryptogram generation key and the token.

9. The processor computer of claim 7, the steps further comprising receiving an authorization response message from the authorization computer, the authorization response message comprising an authorization result generated by the authorization computer based on the modified authorization request message.

10. The processor computer of claim 7, further comprising a hardware secure module (HSM) storing the second master key.

11. The processor computer of claim 7, wherein the token is domain restricted.

12. The processor computer of claim 7, wherein the first master key has a limited use.

13. A method comprising:
   receiving, by a token requestor computer from a processor computer in a processing network, a first master key and a token, the first master key having been generated by the processor computer as an output of a cryptographic function that processes (a) a second master key managed by the processor computer and (b) an identifier of the token requestor;
   generating, by the token requestor computer, a cryptogram generation key using the first master key;

generating, by the token requestor computer, a cryptogram using the cryptogram generation key and the token;

generating, by the token requestor computer, an authorization request message comprising the token and the cryptogram; and transmitting, by the token requestor computer to the processor computer, the authorization request message, thereby causing the processor computer to validate the cryptogram, identify a primary account identifier corresponding to the token, and generate a modified authorization request message comprising an indication of the validation of the cryptogram and the primary account identifier.

14. The method of claim 13, further comprising:

after receiving the first master key, transmitting, by the token requestor computer to the processor computer, a request for the token, wherein the token is received responsive to transmitting the request for the token.

15. The method of claim 13, wherein the first master key was generated by the processor computer using a second master key.

\* \* \* \* \*